United States Patent [19]
Kwak

[11] Patent Number: 5,546,511
[45] Date of Patent: Aug. 13, 1996

[54] HIGH SPEED VIDEO IMAGE PRINTING METHOD AND AN APPARATUS THEREFOR

[75] Inventor: Heui-kuk Kwak, Kyungki-do, Rep. of Korea

[73] Assignee: Samsung Electronics Co. Ltd., Kyungki-Do, Rep. of Korea

[21] Appl. No.: 998,845

[22] Filed: Dec. 30, 1992

[30] Foreign Application Priority Data

Dec. 30, 1991 [KR] Rep. of Korea ................... 91-25453

[51] Int. Cl.⁶ ............................................ G06K 9/00
[52] U.S. Cl. ................................... 395/106; 358/445
[58] Field of Search ................ 395/106; 358/296, 358/504, 479, 445; 345/22, 140; 346/108

[56] References Cited

U.S. PATENT DOCUMENTS

| | | | |
|---|---|---|---|
| 3,854,010 | 12/1974 | Yoshino | 370/105 |
| 3,950,615 | 4/1976 | Murase | 358/410 |
| 4,237,494 | 12/1980 | Yamaguchi | 358/426 |
| 4,397,521 | 8/1983 | Antos et al. | 359/217 |
| 4,539,592 | 9/1985 | Tahana et al. | 348/448 |
| 4,574,309 | 3/1986 | Arisawa et al. | 358/212 |
| 4,590,522 | 5/1986 | Tauemoto et al. | 358/321 |
| 4,686,574 | 8/1987 | Erhardt | 348/324 |
| 4,731,602 | 3/1988 | Hata | 340/347 MT |
| 4,802,001 | 1/1989 | Tabei et al. | 348/280 |
| 4,864,430 | 9/1989 | Yoshimura et al. | 360/10.2 |
| 4,885,787 | 12/1989 | Okamoto et al. | 382/54 |
| 4,891,713 | 1/1990 | Miluuoshi et al. | 358/445 |
| 4,901,165 | 2/1990 | Matsuo | 350/335 |
| 4,905,085 | 2/1990 | Faulhaber | 358/148 |
| 4,965,662 | 10/1990 | Shiota | 358/78 |
| 4,974,058 | 11/1990 | Takayama | 358/75 |
| 4,984,094 | 1/1991 | Emori | 358/335 |
| 5,030,954 | 7/1991 | Ribner | 341/172 |
| 5,115,312 | 4/1992 | shim | 348/448 |
| 5,140,157 | 8/1992 | Ohshima et al. | 250/235 |
| 5,289,310 | 2/1994 | Park | 358/443 |
| 5,349,446 | 9/1994 | Kwak | 358/296 |

*Primary Examiner*—Raymond J. Bayerl
*Assistant Examiner*—Gabriel I. Garcia
*Attorney, Agent, or Firm*—Sughrue, Mion, Zinn, Macpeak & Seas

[57] ABSTRACT

Disclosed are a printing method capable of high speed printing of a color video printer using a frame-sequential method, and a printing apparatus adapted thereto. The printing method comprises the steps of sampling a video signal by two times for a duration of one horizontal scanning line within one frame to generate digitally converted pixel data, alternately writing the digitally converted pixel data in two line memories by frame periods, and alternately reading the digital data which is stored in the two line memories to perform printing of the read digital data. Here, two vertical lines are written in a first line memory during one frame, and the written two vertical lines are printed for a subsequent frame while alternately writing in a second memory two more vertical lines which are sequential to the printed vertical lines. Accordingly, a doubled printing speed is obtained compared with the conventional method of alternately printing single lines.

23 Claims, 8 Drawing Sheets

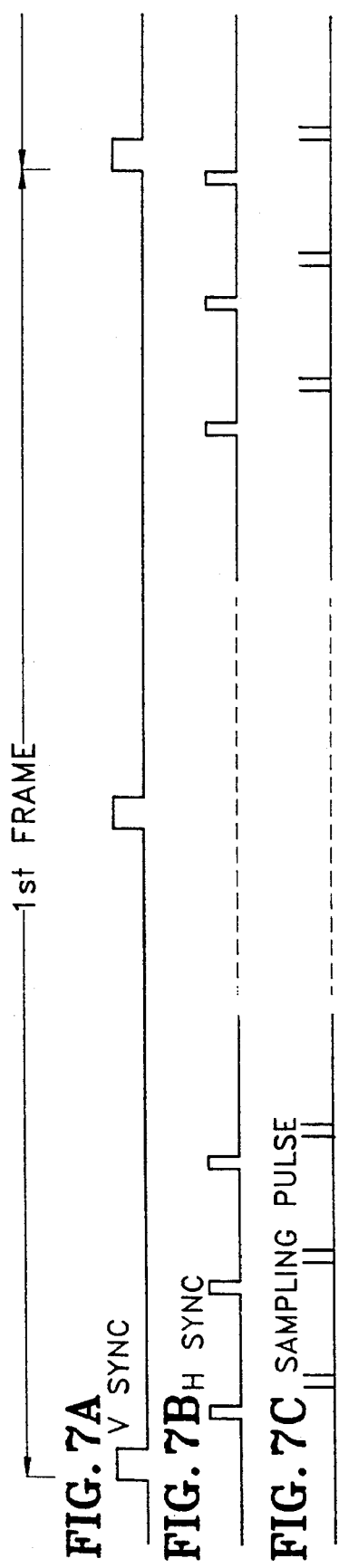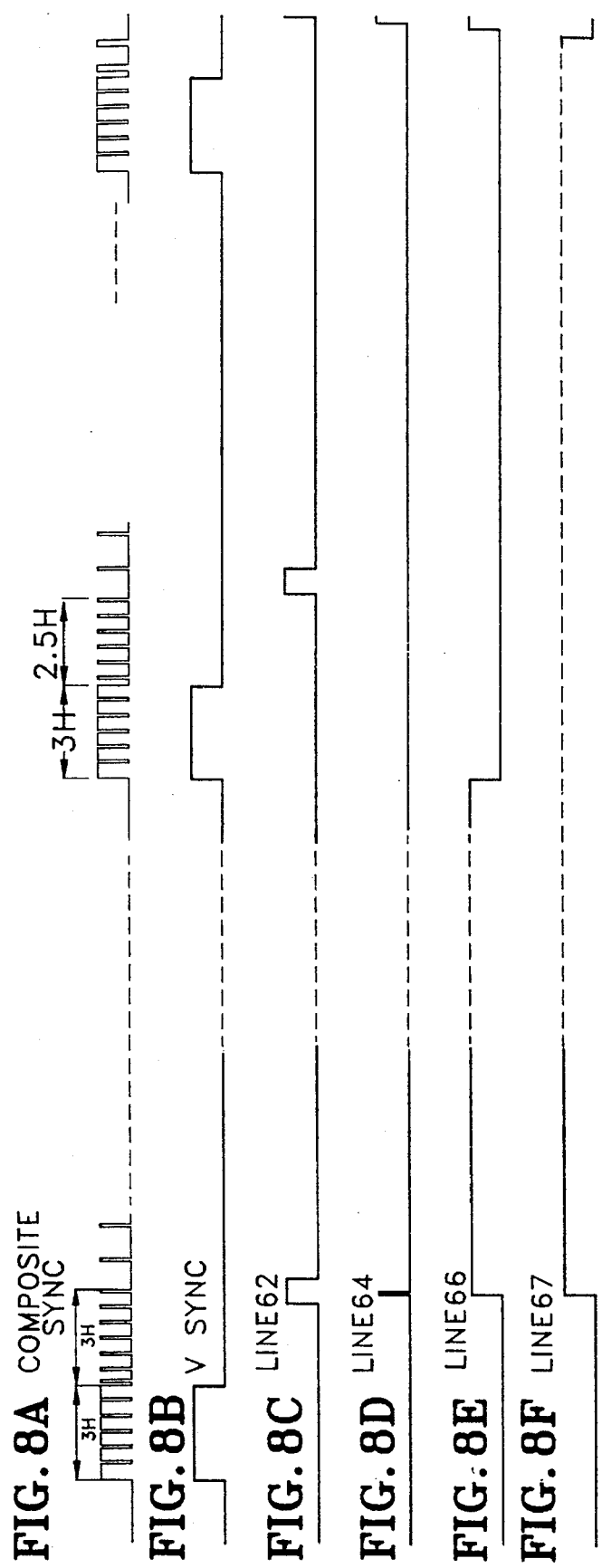

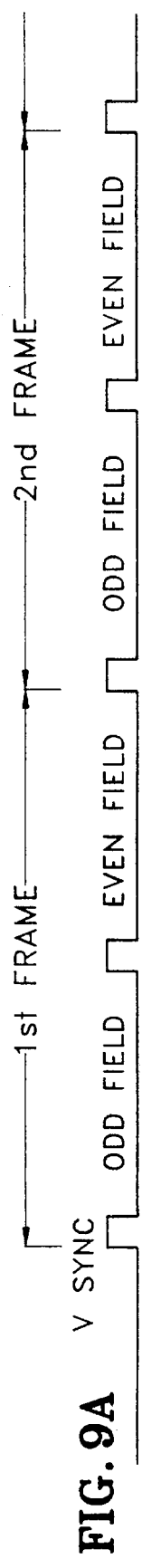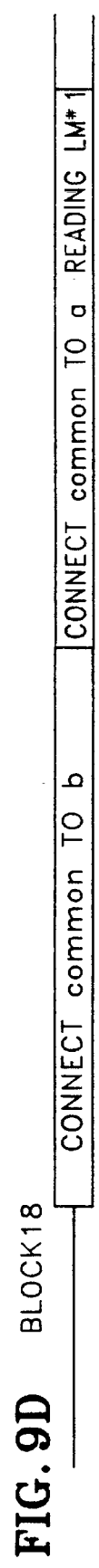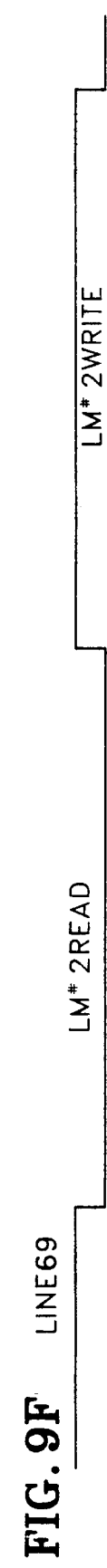

HIGH SPEED VIDEO IMAGE PRINTING METHOD AND AN APPARATUS THEREFOR

BACKGROUND OF THE INVENTION

The present invention relates to a color video printer, and more particularly to a printing method for the high-speed printing of a color video printer using a frame-sequential method, and a printing apparatus suitable for employing the method.

Color video printers output a hard copy of an input still image signal. In printers using a sublimation thermal transfer system, current corresponding to a video signal to be written is supplied to a thermal printing head (TPH: a write electrode composed of a series of heat emitting devices), and dyes adhered to a transfer film disposed adjacent thereto are allowed to sublimate by heat generated from the TPH, so that image information is written on a sheet of paper.

The printers using the sublimation thermal transfer system separate a video signal of one frame into a color signal having RGB components, and perform the printing by sequential frames of each color component.

FIG. 1 is a block diagram showing a conventional color video printer. The color video printer shown in FIG. 1 carries out the printing by selectively receiving a composite video signal from a display (e.g., a TV receiver or video recorder) and a super video signal from a graphic apparatus (e.g., a computer).

A signal in the form of a composite video signal is supplied to a luma/chroma signal (Y/C) separator 1. The output from Y/C separator 1 is supplied to one input of an input selector 2. In the meantime, the other input of input selector 2 is supplied with a signal in the form of a super video signal.

The signal selected in input selector 2 is supplied to a color difference signal decoder 3. The color difference signal in color difference signal decoder 3 is supplied to a still/moving picture selecting unit comprising a first selection switch 4a and a second selection switch 4b. The color difference signal output from one output of first selection switch 4a is input to a still picture memory 5 whose output is supplied to one input of second selection switch 4b. Meanwhile, the color difference signal from the other output of first selection switch 4a is directly supplied to the other input of second selection switch 4b. The color difference signal in second selection switch 4b is supplied to an RGB decoder 6. The color signal output from RGB decoder 6 is simultaneously supplied to an encoder 7 and a printing unit 10. The composite video signal from encoder 7 is monitored via a display 8.

Meanwhile, the color signal supplied to printing unit 10 is hard-copied via a TPH 20. Hereinbelow, the construction of printing unit 10 will be described in detail.

The, color signal input to printing unit 10 is first supplied to an RGB selector 11. The color signal selected in RGB selector 11 is supplied to an analog-to-digital (A/D) converter 12. The signal digitized in A/D converter 12 is supplied via n bit lines to an input switch 14. The signal from input switch 14 is supplied to a line memory 16. The signal from line memory 16 is supplied to an output switch 18. The signal from output switch 18 is supplied to an intermediate gradation converter (IGC) 19. The pulse-width-modulated signal from IGC 19 is supplied to TPH 20 which then carries out the printing. A sampling pulse generator 13 generates a sampling pulse required in A/D converter 12 and a line memory controller 17 which, using the sampling pulse, produces an address and control signal required in line memory 16. An I/O switching controller 15 generates a signal for controlling both input and output switches 14 and 18.

Now, the operation of the printer having the above-described construction will be described. The "composite video signal separated into luma/chroma" or "super video" signal selected corresponding to a composite/super selection signal in input selector 2 is supplied to color difference signal decoder 3. The color difference signal having R–Y, B–Y and Y components in color difference signal decoder 3 is supplied to the still/moving picture selector unit (4a and 4b). In conjunction with the still/moving picture selector unit, still picture memory 5 is provided to store a video signal in frames, for the case of the input signal being a moving image signal.

When the moving picture is selected by means of a still/moving picture selection signal, first selection switch 4a is controlled to output the input signal to a first output, and second selection switch 4b is controlled to output the signal input to its first input. By this operation, a video signal of one frame in the moving video signal input to the color video printer is separated, to thereby be stored in still picture memory 5; otherwise, the still picture signal stored in still picture memory 5 is output to be printed.

On the other hand, when the still picture is selected, first selection switch 4a is controlled to output the input signal to its second output, and second selection switch 4b is controlled to output the signal input to its second input. Accordingly, the still picture signal input to the color video printer is thus printed.

Since the moving picture signal input to the color video printer is composed of a video signal having several frames, one frame is separated to thereby be stored as a still picture. In this state, the video signal input to still picture memory 5 is digitized in an analog-to-digital (A/D) converter 5a and then stored in a memory 5b. Therefore, when the still image signal stored in memory 5b is to be printed, it is first read out and converted into an analog signal via a digital-to-analog (D/A) converter 5d, and then the analog signal is output. Memory controller 5c generates an address and control signal for memory 5b.

The color difference signal from second selection switch 4b is converted into R, G and B signals suitable for use in printing unit 10 by means of RGB decoder 6, and then is supplied to RGB selector 11 of printing unit 10. R, G or B signal selected in RGB selector 11 is supplied to the cyan/magenta/yellow transfer film, and then hard-copied onto the sheet of paper. In accomplishing such a hard copy, the B signal is first selected to print the B component of the still picture, followed by the G signal being selected to print the G component, and then the R signal is selected to print the R component. This printing method is called the "frame-sequential" method because a still picture's RGB components are sequentially printed in frame units.

Next, the printing of the selected R, G or B signal will be described in detail. The signal selected in RGB selector 11 is digitized in A/D converter 12, and then supplied to input switch 14. In performing the frame-sequential printing of one frame of a still picture, the color video printer having the structure shown in FIG. 1 sequentially prints the pixels in the vertical direction of the pixel array constituting one frame, from left to right by columns. By this operation, A/D converter 12 must perform the sequential sampling of the vertical lines of the pixel array constituting one frame, from left to right. The sampling pulse corresponding to this sampling is produced in sampling pulse generator 13.

The digitized pixel signal from input switch 14 is stored in line memory 16 to be output to IGC 19 via output switch 18, thereby being pulse-width-modulated. The pulse-width-modulated signal is supplied to TPH 20 so that the printing can be executed.

Line, memory 16 for the reading and writing of pixels in the column direction which are digitized in A/D converter 12, includes two line memories (LM) for performing high-speed printing, so that the read/write operations are carded out by the complimentary operation of first and second line memories 16a and 16b. The control signal needed in input and output switches 14 and 18 is supplied from I/O switching controller 15, and the address and control signal for read/write operation of line memory 16 is supplied from line memory controller 17.

During printing by printing unit 10, the picture being printed is monitored via encoder 7 and display 8.

FIG. 2 shows the relation between the pixel array and the line memory in one frame. Here, the oblique solid lines indicate the horizontal scanning lines in an odd field, and the oblique dotted lines indicate the horizontal scanning lines in an even field. In the NTSC system, each field has 262.5 horizontal scanning lines which are interleaved with each other.

For convenience of explanation, the first horizontal line of a odd field is called a first scanning line, the first horizontal scanning of an even field is a second scanning line, the second horizontal line of an odd field is a third scanning line, and the second scanning of an even field is a fourth scanning line. Accordingly, in FIG. 2, the odd field consists of the odd-numbered horizontal lines, and the even field consists of the even-numbered horizontal lines.

The, pixel array of one frame is formed by a number of pixels X per horizontal scanning line and a number of pixels Y in the vertical direction. For example, in the NTSC system, X is 600 and Y is 525 which is the same as the number of horizontal scanning lines. Also, assuming that an interval of the horizontal scanning line from the first pixel to the last pixel is an effective horizontal scanning duration $T_{VH}$, sampling frequency fs becomes equal to the number of pixels per horizontal scanning line divided by the effective horizontal scanning duration, that is, $X/T_{VH}$.

The printing of one frame is achieved by successively printing one line in the vertical direction of the pixel array from left to right. First, in the first frame period, the pixels of the first vertical line denoted by x's at the left are consecutively sampled from top to bottom, thereby being written in first line memory 16a. In the second frame period, the pixels of the second vertical line are sampled to be written in second line memory 16b and, at the same time, the pixels of the first vertical line written in first line memory 16a are read out to be printed via IGC 19 and TPH 20. Then, in the third frame period, the above-described operation is reversely performed, so that the writing in first line memory 16a and the reading out of second line memory 16b are carried out. By doing so, the printing of 600 vertical lines is completed which results in the printing of one color. The still picture of one frame is printed by repeating the above printing operation for each of the three colors.

FIG. 3 is a timing chart showing read/write operations of line memory. During the first frame period, the first vertical line is written in first line memory 16a. During the second frame period, the pixels written in first line memory 16a are read out during the odd-field period, thereby being printed. The even-field period is provided as a heat-emission period of the TPH. During the third frame period, the first vertical line is written in first line memory 16a.

Meanwhile, the second vertical line is written in second line memory 16b during the second frame period. In the third frame period, the pixels written in second line memory 16b are read out during the odd-field period, thereby being printed. The even-field period is provided as the heat-emission period of the TPH. During the fourth frame period, the fourth vertical line will be written in second line memory 16b.

In the above-described color video printer, given the frame period of the NTSC system as 1/30th of a second ($\approx 33$ ms), the time required for printing one color of the still picture of one frame can be calculated thus: 33 ms×600 lines=19.8 s, so that the time required for printing one frame is 19.8 S×3=59.3 S. Therefore, if the time for paper-feeding and paper-discharge takes twenty seconds, the total printing time for the still picture of one frame becomes approximately 80 seconds.

Experimentation shows that picture quality remains unaffected even though the printing is successively performed by eliminating the heat-emission period illustrated in FIG. 3. Accordingly, it is preferable to provide an apparatus capable of increasing printing speed by successively printing two vertical lines during one frame period.

SUMMARY OF THE INVENTION

It is an object of the present invention to provide a printing method for increasing the printing speed by doubling the number of vertical lines printable for one frame period in a color video printer.

It is another object of the present invention to provide a printing apparatus suitable for the printing method.

To achieve the object of the present invention, there is provided a printing method for printing one frame of still video signals having a horizontal and vertical pixel arrangement by vertical lines, comprising the steps of:

sampling a video signal twice for one period of horizontal scanning in one frame to generate digitized pixel data;

alternately writing the digitized pixel data in two line memories by frames; and alternately reading out the digitized pixel data written in the two line memories by frames, so as to print the read out data.

To achieve another object of the present invention, there is provided a printing apparatus for printing one frame of still video signals having a horizontal and vertical pixel arrangement by vertical lines, comprising:

an analog-to-digital converter for sampling a video signal twice for one period of horizontal scanning in one frame to generate digitized pixel data;

two line memories for alternately writing in or reading out the digitized pixel data by frames; and an input switch for alternately inputting the digitized pixel data in the two line memories by frames;

an output switch for alternately outputting the digitized pixel data written in the two line memories;

a sampling pulse generator for generating a sampling pulse for use in the analog-to-digital converter;

an input/output switching controller for generating a signal which controls the input switch and output switch; and a line memory controller for generating a read/write address of the two line memories.

BRIEF DESCRIPTION OF THE DRAWINGS

The above objects and other advantages of the present invention will become more apparent by describing in detail a preferred embodiment thereof with reference to the attached drawings in which:

FIGS. 7A, 7B and 7C are waveforms showing the operation of the sampling pulse generator shown in FIG. 6;

FIGS. 8A–8F are waveforms showing the operation of the I/O switching controller shown in FIG. 6;

FIGS. 9A–9F is a timing chart showing the I/O operations of the line memory shown in FIG. 6.

DETAILED DESCRIPTION OF THE INVENTION

Figure 4:
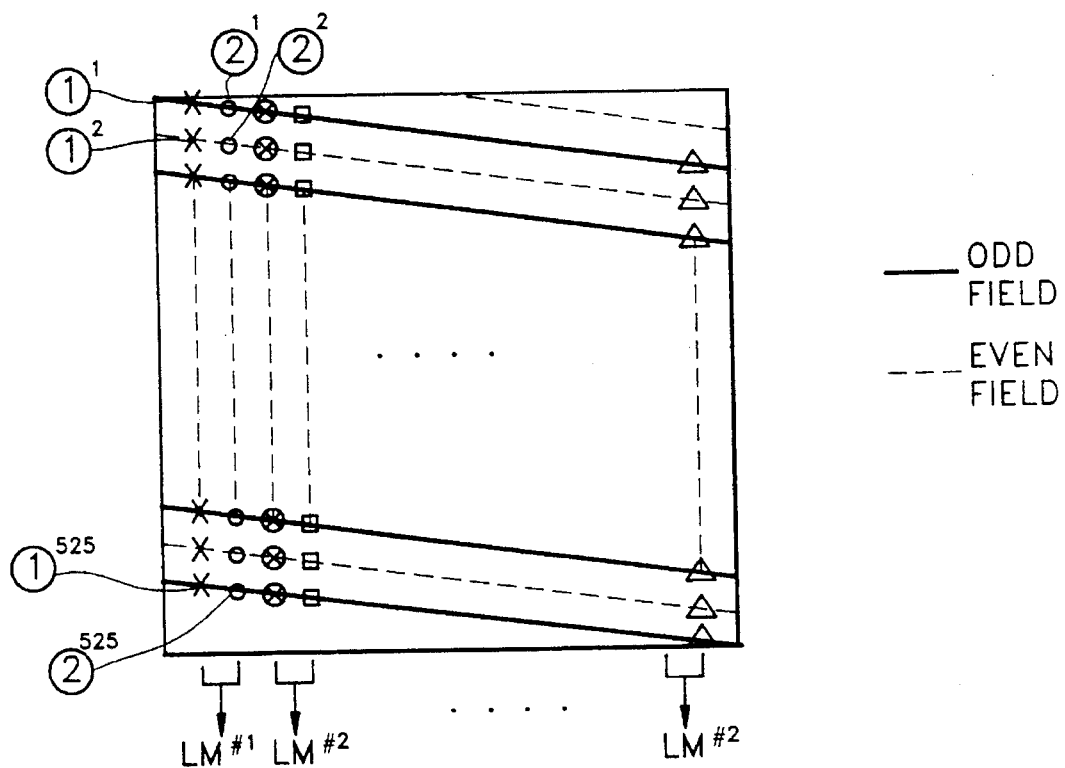
FIG. 4 is a view showing the relation between the pixel array and a line memory in one frame according to the present invention.
Figure 3:
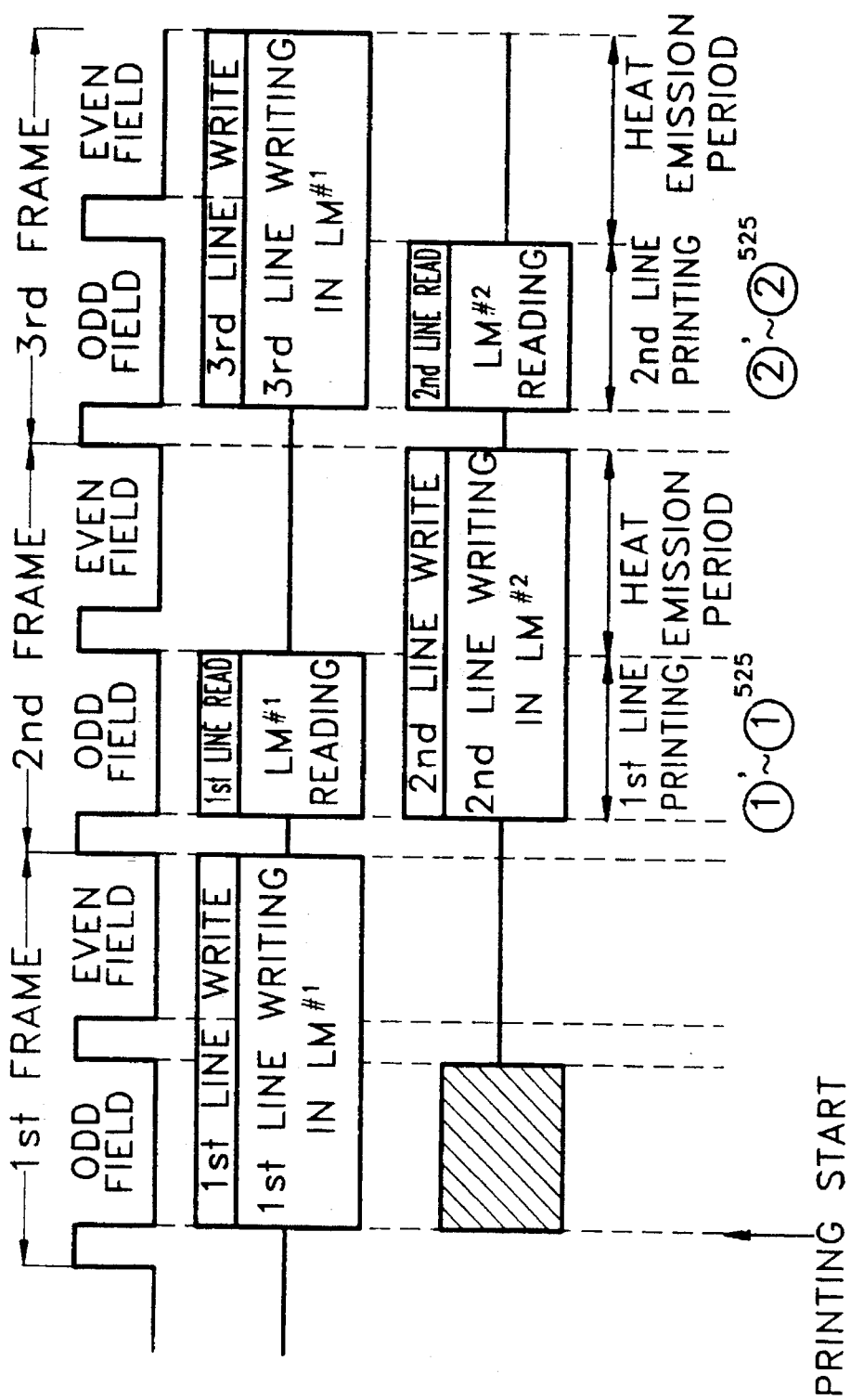
FIG. 3 is a timing chart showing the printing operation according to the construction of FIG. 1.

FIG. 4 shows a relationship between the pixels in the frame screen and the line memories according to the present invention. The operation of printing one frame is accomplished by printing two vertical lines of the pixel array from left to right in succession. Firstly, in the duration corresponding to one frame, the pixels designated by "×" in the first vertical line and pixels designated by "○" in the second vertical line on the left side of FIG. 4, being sampled in sequence from top to bottom, are stored in a first line memory. After all the pixels of the first and second vertical lines are stored in the first line memory, the pixels in the third and fourth vertical lines (shown as "⊗" and "□") are sampled to be written in a second line memory and simultaneously the pixels of the first and second vertical lines are read from the first line memory and printed via IGC 19 and TPH 20. When the write operation into the second line memory and the read operation from the first line memory are completed, the above operations are conversely executed, i.e., writing into the first line memory and reading from the second are performed.

Figure 5:
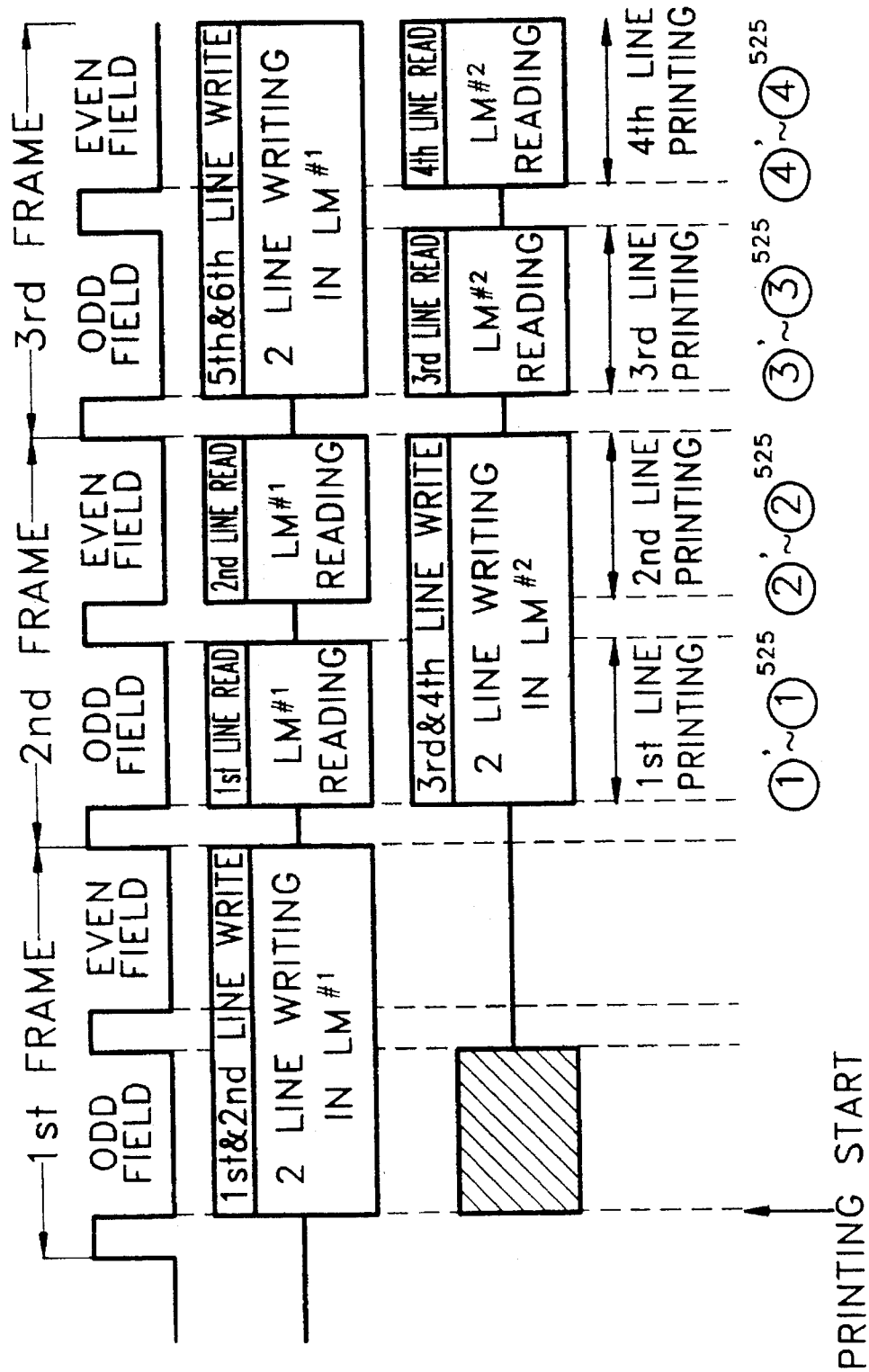
FIG. 5 is a timing chart showing the printing operation in the present invention.

FIG. 5 is a timing diagram showing the read/write operation of the line memory according to the present invention. During the first frame, the pixels of the first and second vertical lines are written in the first line memory. During the odd field of the second frame, the pixels of the first vertical line having been written in are read out therefrom to be printed, and during the even field, the pixels of the second vertical line are read out therefrom and printed. The pixels of the fifth and sixth vertical lines are written in the first line memory during the third frame.

On the other hand, the third and fourth vertical lines are written in a second line memory during the second frame. During the odd field of the third frame, the pixels of the third vertical line having been written in the second line memory are read out therefrom to be printed, and during the even field, the pixels of the fourth vertical line are read out therefrom and printed. The pixels of the seventh and eighth vertical lines are written in the second line memory during the fourth frame.

Figure 6:
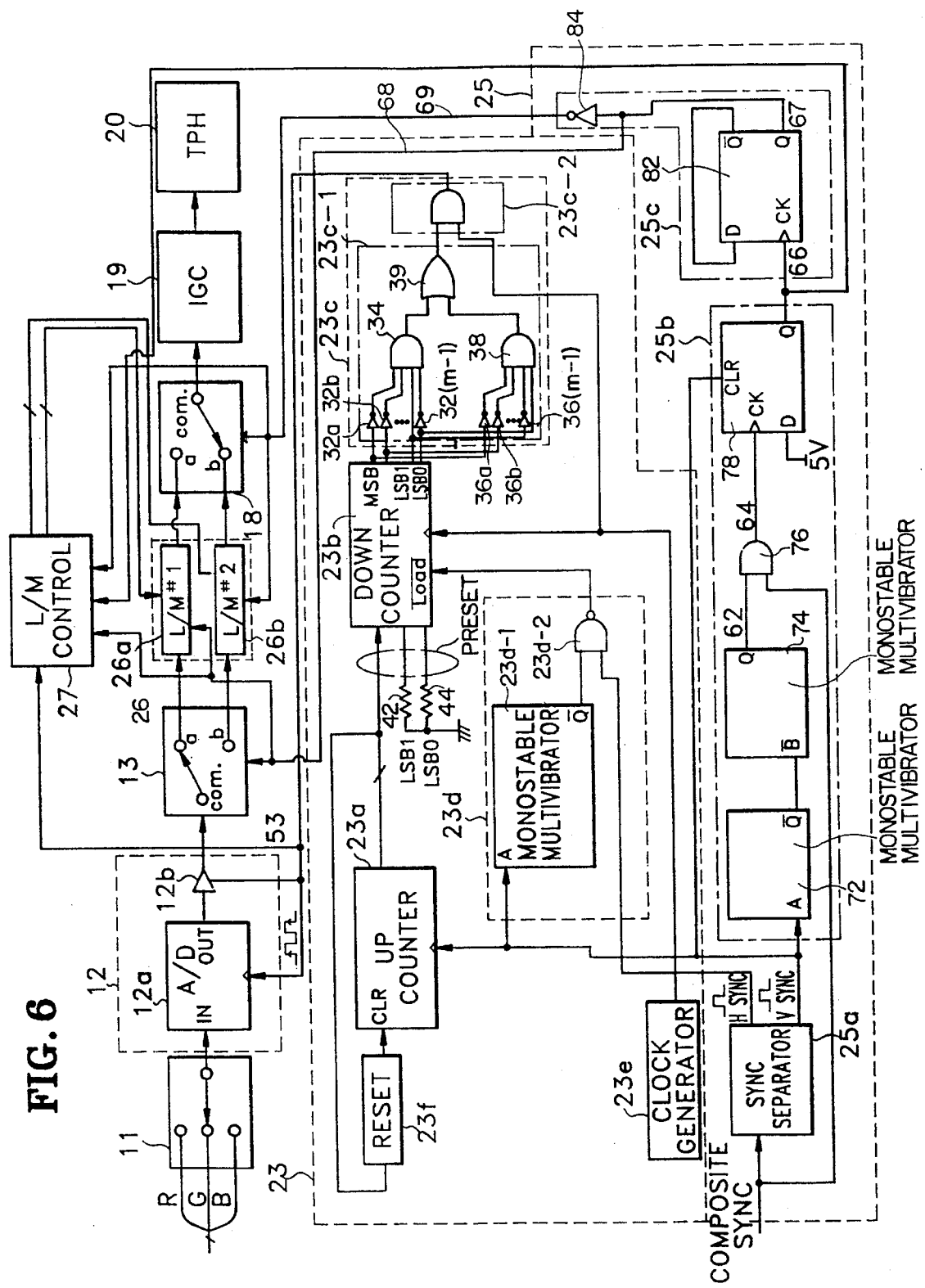
FIG. 6 is a block diagram showing the construction of a printing apparatus/according to the present invention.

FIG. 6 is a block diagram of the color video printer in accordance with the present invention. In FIG. 6, like reference numerals corresponding to like parts of FIG. 1 are adopted, and so the detailed description thereof will be omitted.

Figure 1:
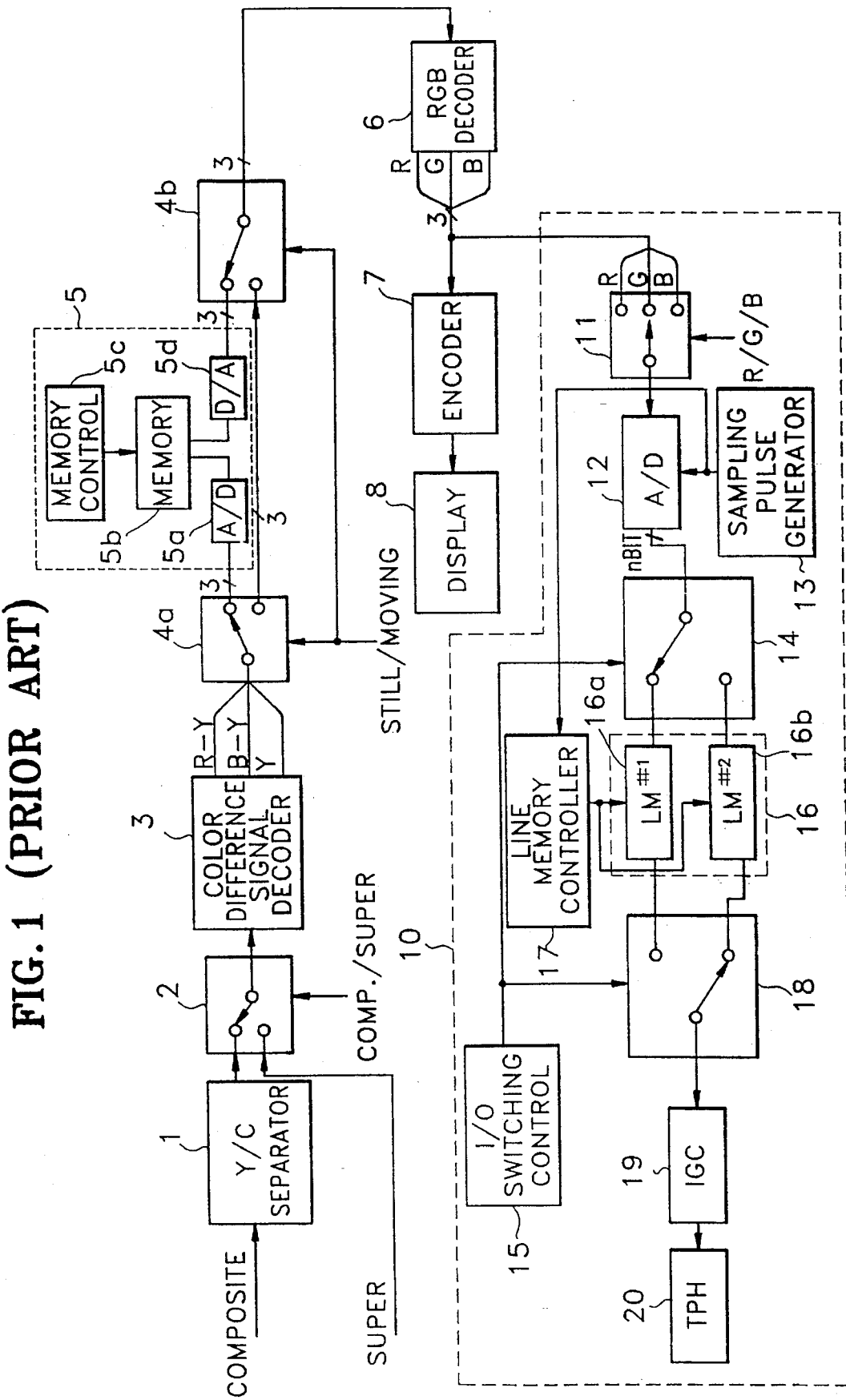
FIG. 1 is a block diagram showing a conventional color video printer.
Figure 2:
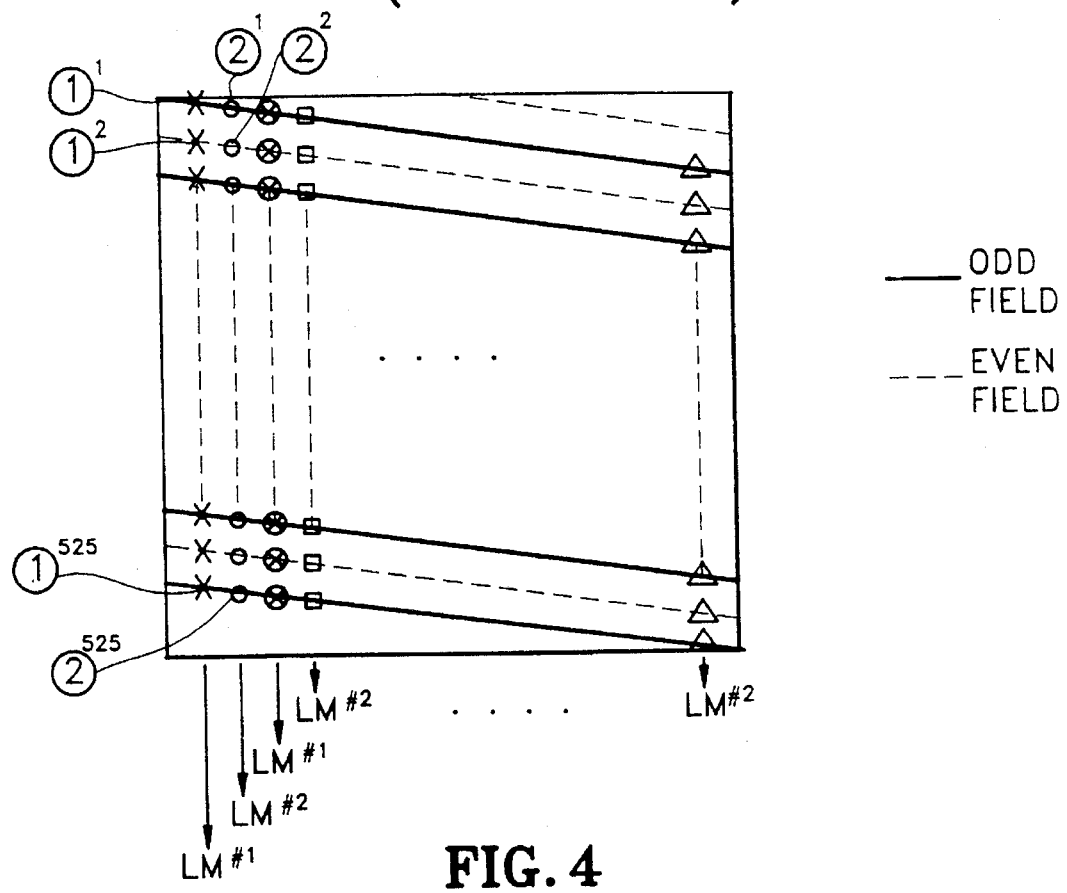
FIG. 2 is a view showing the relation between the pixel array and a line memory in one frame according to a conventional technique.

In the color video printer apparatus of FIG. 6, line memory 26 corresponds to line memory 16 of FIG. 1, sampling pulse generator 23 to sampling pulse generator 13 of FIG. 1, input/output switch controller 25 to input/output switch controller 15 of FIG. 1, and line memory controller 27 to line memory controller 17 of FIG. 1.

First line memory 26a and second line memory 26b of line memory 26 have capacities adapted to store the pixels of two vertical lines as shown in FIG. 4. In the NTSC method, since the number of pixels of one vertical line is 525 (equal to the number of the horizontal scanning lines), memory capacities of 1,050 (525×2) are necessary to store two vertical lines. Accordingly, the number of bits for address assignment should be 10.

A/D converter 12 comprises tri-state buffer 12b for maintaining a high-impedance output thereof, when the A/D conversion is not performed.

Sampling pulse generator 23 comprises an up-counter 23a for counting the frame period, a down-counter 23b for loading and counting the value counted in up-counter 23a as a preset value by the period of the horizontal scanning line, a pulse generator 23c for generating a sampling pulse for a binary value of "10" or "01" by detecting the counted value from down-counter 23b, a delay circuit 23d for delaying the operation of down-counter 23b from the vertical sync pulse to the effective horizontal scanning line pulse, a clock generator 23e for generating clock signal having the period of the sampling pulse, and a reset circuit 23f for resetting up-counter 23a.

Two resistors 42 and 44 are connected in parallel to preset input terminals of down-counter 23b. These resistors 42 and 44 provide the offset for the second lowest bit (LSB1) and the least significant bit (LSB0) of the preset input value, respectively.

Pulse generator 23c comprises a sampling pulse location detector 23c–1 for detecting the final value, or final value minus one, by detecting the down-counted value of down-counter 23b, and an AND gate 23c–2 for generating the sampling pulse being supplied to A/D converter 12 by logically AND-operating the output of sampling pulse location detector 23c–1 and the clock signal.

Sampling pulse location detector 23c–1 comprises m–1 inverters 32a, 32b, . . . 32(m–1) corresponding to the m–1 output lines excluding the second lowest bit (LSB1) among the m-bit output lines from down-counter 23b, an AND gate 34 which receives the respective outputs of inverters 32a through 32(m–1) and the LSB1 output, m–1 inverters 36a, 36b, . . . 36(m–1) corresponding to the m–1 output lines excluding the least significant bit (LSB0) among the m-bit output lines from down-counter 23b, an AND gate 38 which receives the respective outputs of inverters 36a through 36(m–1) and the LSB0 output, and an OR gate 39 which receives the outputs of the above two AND gates 34 and 38.

Delay circuit 23d comprises a monostable multivibrator 23d–1 for generating an interval signal corresponding to effective horizontal scanning duration $T_{VH}$ in response to the input vertical sync signal, and a NAND gate 23d–2 which receives the interval signal and the horizontal sync signal.

Clock generator 23e generates the clock signal having a period which is determined by dividing the duration of effective horizontal scanning by the number of pixels in the horizontal direction.

Reset circuit 23f clears up-counter 23a after the final vertical line has been printed.

FIGS. 7A, 7B and 7C are waveform diagrams showing the operation of the sampling pulse generator shown in FIG. 6. FIG. 7A shows the waveform of the vertical sync signal being input to up-counter 23a. Up-counter 23a counts by one for every two vertical sync signals (one frame) input and supplies the output thereof to down-counter 23b. FIG. 7B shows the waveform of the, horizontal sync signal being input to an inverted load terminal of down-counter 23b. Down-counter 23b loads the preset value being applied thereto for each horizontal sync signal being input, and down-counts in accordance with the clock signal input via its clock input terminal. FIG. 7C shows the waveform of the sampling pulse being supplied to A/D converter 12 of FIG. 6. Pulse generator 23c detects the counted value of down-counter 23b, thereby for a binary counted value of "10" or "01," gating the clock signal to supply a sampling pulse. As shown in FIG. 4, A/D converter 12 should control the sampling position so as to sample the pixels of the first and second vertical lines during of the first frame, and those of the third and fourth vertical lines during the second frame. To perform the above operation, the lapsed frame duration is counted and the counted value is down-counted by subtracting the period of the clock signal therefrom, so that the sampling position can be changed. Here, since an accurate sampling pulse is not obtainable for the counted values of "1" and "2" in the first and second frames, an offset of "11" is added to the preset value of down-counter 23b. In addition, a delay circuit 23d limits the input of the horizontal sync signal from the vertical sync duration to the effective horizontal scanning duration.

Input/output switch controller 25 includes a sync separator 25a for separating the horizontal sync signal and vertical sync signal from the composite sync signal, a field identifier 25b for generating the field identification signal from the composite sync signal and vertical sync signal, and a frame identifier 25c for generating the frame identification signal by dividing-by-two the field identification signal. Here, field identifier 25b comprises two serially connected monostable multivibrators 72 and 74 for generating the detected pulse of FIG. 8C, an AND gate 76 which receives the detected pulse and the composite sync signal, and a D flip-flop 78 for receiving the output of AND gate 76 and generating the field identification signal of FIG. 8E. Also, frame identifier 25c comprises a D flip-flop 82 for dividing the field identification signal by two and generating the frame identification signal of FIG. 8F, and an inverter 84 for inverting the frame identification signal from D flip-flop 82.

FIGS. 8A through 8E are waveform diagrams showing the operations of input/output switch controller 25. FIG. 8A shows a waveform of the composite sync signal including the equalization pulse. Odd fields include the sixth equalization pulse following the vertical sync signal, but even fields do not have this kind of pulse, which enables field identification signal to be generated. To detect the sixth equalization pulse (shown in FIG. 8D) by using the vertical sync signal shown in FIG. 8B, the detected pulse shown in FIG. 8C is generated, and then the signals represented by the waveforms of FIGS. 8A and 8C are logically AND-operated through the AND gate of input/output switch controller 25. The equalization pulse and vertical sync signal shown in FIG. 8D are used to generate the field identification signal shown in FIG. 8E. Moreover, the field identification signal of FIG. 8E is divided by two so as to generate the frame identification signal shown in. FIG. 8F.

FIGS. 9A through 9F are timing diagrams showing the input/output operation of line memory 26 shown in FIG. 6. FIG. 9A shows the waveform of the vertical sync signal. FIG. 9B shows the waveform of the frame identification signal. FIGS. 9C and 9D show the operations of input switch 13 and output switch 18, respectively, corresponding to the timing of the frame identification signal shown in FIG. 9B. FIGS. 9E and 9F show the read/write timings of line memories 26a and 26b, respectively, corresponding to the timing of the frame identification signal shown in FIG. 9B.

Figure 10:
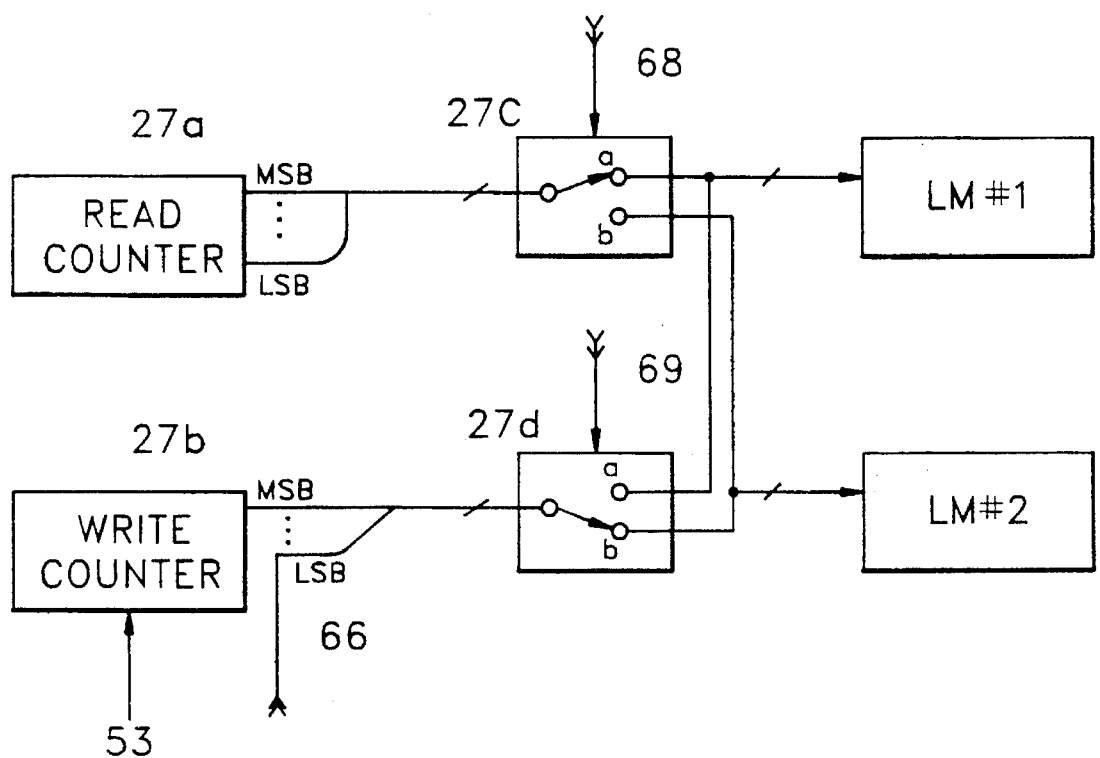
FIG. 10 is a block diagram showing the construction of the line memory controller shown in FIG. 6.

FIG. 10 is a block diagram showing line memory controller 27. Line memory controller 27 comprises a read address counter 27a for generating the read address, a write address counter 27b for generating the write address, a read address switch 27c for selectively outputting the address of read address counter 27a to first line memory 26a or second line memory 26b, and a write address switch 27d for selectively outputting the address of write address counter 27b to first line memory 26a or second line memory 26b.

Read address counter 27a generates the addresses to read the pixels of the odd- and even-field vertical lines during one frame, respectively.

Write address counter 27b counts the recording address by the period of sampling pulses, and the least significant bit (LSB) of the address output therefrom is replaced with the odd/even field identification signal, so that the pixels of the odd and even fields constituting one vertical line have successive addresses. The most significant bit (MSB) of the addresses output from write address counter 27b is replaced with a signal which is obtained by dividing-by-two the sampling pulse supplied to A/D converter 12, so that the write addresses of the preceding vertical line and the succeeding vertical line become discontinuous.

As described above, the printing apparatus according to the present invention has an advantage of decreasing the time necessary in printing a still image of one frame to half that of the conventional printer apparatus, by writing two vertical lines in the first line memory during one frame, and then writing two vertical lines in the second line memory during the following frame. Simultaneously, the printing apparatus reads the pixels of two vertical lines from the first line memory to be printed, and repetitively performs operations which are the reverse of those above, during the following frame.

Therefore, the present invention enhances the competitiveness of the printer apparatus, by satisfying user requirements for high-speed printing.

In the above present embodiment, a color video printer having color difference memories is described. However, it is noted that the concept of the present invention can be also applied to a color video printer having R, G and B memories.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A printing method for printing one frame of still video signals having horizontal and vertical pixel arrangement by vertical lines, comprising the steps of:

sampling a video signal twice for one period of horizontal scanning in one frame to generate digitized pixel data;

alternately writing said digital pixel data in two line memories by frames; and alternately reading out said digital pixel data written in said two line memories by frames, so as to print the read data.

2. A printing method as claimed in claim 1, wherein said sampling step comprises the steps of:

counting up the time of one frame;

loading said counted-up value as a preset value whenever a horizontal sync signal is generated and counting down the value by sampling periods; and detecting said counted-down value so as to be sampled at the location of a final value and at the location of the final value minus one.

3. A printing method as claimed in claim 2, wherein, in said counting-up step, the counting up is performed by dividing-by-two a vertical sync signal.

4. A printing method as claimed in claim 3, wherein, said counting-up step further comprises a step of clearing said counted-up value after the printing of a final vertical line.

5. A printing method as claimed in claim 2, wherein, in said counting-down step, the preset value contains an offset to guarantee the generation a sampling pulse in first and second frames.

6. A printing method as claimed in claim 2, wherein said counting-down step further comprises a delaying step for blocking the counting-down operation from a vertical sync period to an effective horizontal scanning period.

7. A printing method as claimed in claim 1, wherein, in said writing step, continuous pixels of odd and even fields are stored in continuous writing addresses.

8. A printing method as claimed in claim 1, wherein, in said writing step, a preceding vertical line and a succeeding vertical line are stored in discontinuous writing addresses.

9. A printing method as claimed in claim 1, wherein, in said reading-out step, two vertical lines written in one line memory are read out by lines in odd and even fields.

10. A printing apparatus for printing one frame of still video signals having a horizontal and vertical pixel arrangement by vertical lines, comprising:

an analog-to-digital converter for sampling a video signal twice for one period of horizontal scanning in one frame to generate digitized pixel data;

two line memories for alternately writing in or reading out said digitized pixel data by frames; and an input switch for alternately inputting said digitized pixel data in said two line memories by frames;

an output switch for alternately outputting said digitized pixel data written in said two line memories;

a sampling pulse generator for generating a sampling pulse for use in said analog-to-digital converter;

an input/output switching controller for generating a signal which controls said input switch and output switch; and a line memory controller for generating a writing/reading address of said two line memories.

11. A printing apparatus as claimed in claim 10, wherein said analog-to-digital converter further comprises a tri-state buffer for keeping a high output impedance when the analog-to-digital converting operation is not performed.

12. A printing apparatus as claimed in claim 10, wherein said sampling pulse generator comprises:

an up-counter for up-counting frame periods;

a down-counter for loading said counted value of said up-counter as a preset value by horizontal scanning line periods and down-counting the value by sampling pulse periods;

a pulse generator for detecting said counted value of said down-counter so as to generate a sampling pulse at the location of a final value and at the location of the final value minus one; and a clock generator for generating a clock signal having the sampling pulse period.

13. A printing apparatus as claimed in claim 12, wherein said up-counter counts a horizontal sync signal by dividing said horizontal sync signal by two.

14. A printing apparatus as claimed in claim 12, wherein said sampling pulse generator further comprises a delay line for blocking the operation of said down-counter from a vertical sync period to an effective horizontal scanning period.

15. A printing apparatus as claimed in claim 12, wherein said sampling pulse generator further comprises a reset circuit for clearing said counted-up value after a final vertical line is printed.

16. A printing apparatus as claimed in claim 12, wherein said clock generator generates a clock signal having a period which is determined by an effective, horizontal scanning period and the number of horizontal pixels.

17. A printing apparatus as claimed in claim 12, wherein the preset value loaded on said down-counter contains an offset to guarantee the generation of a sampling pulse in first and second frames.

18. A printing apparatus as claimed in claim 12, wherein said pulse generator comprises:

a sampling pulse location detector for detecting the counted-down values of said down-counter to detect a final value or the final value minus one; and an AND gate for logically operating the outputs of said sampling pulse location detector and the clock signal.

19. A printing apparatus as claimed in claim 10, wherein said input/output switching controller comprises:

a sync separator for separating a horizontal sync signal and a vertical sync signal from a composite sync signal;

a field identifier for generating a field identification signal from the composite sync signal and vertical sync signal; and a frame identifier for dividing said field identification signal by two so as to generate a frame identification signal.

20. A printing apparatus as claimed in claim 10, wherein said line memory controller comprises:

a read address counter for generating a read address;

a write address counter for generating a write address;

a read address switch for selectively outputting the address of said read address counter to a first line memory or a second line memory; and a write address switch for selectively outputting the address of said write address counter to the first line memory or the second line memory.

21. A printing apparatus as claimed in claim 20, wherein said write address counter generates recording addresses according to sampling pulse periods.

22. A printing apparatus as claimed in claim 20, wherein the least significant bit of the address output from said write address counter is replaced with an odd/even field identification signal.

23. A printing apparatus as claimed in claim 20, wherein the most significant bit of the address output from said write address counter is replaced with a sampling pulse supplied from said analog-to-digital converter which is divided by two.

* * * * *